United States Patent

[11] 3,568,009

[72] Inventor Bernard Rappaport
Los Angeles, Calif.
[21] Appl. No. 747,992
[22] Filed July 26, 1968
[45] Patented Mar. 2, 1971
[73] Assignee Fansteel Inc.

[54] HERMETICALLY SEALED ELECTROLYTIC DEVICE
4 Claims, 4 Drawing Figs.

[52] U.S. Cl. .................................................. 317/230,
317/244
[51] Int. Cl. ....................................................... H01g 9/10
[50] Field of Search ........................................... 317/230,
231, 233

[56] References Cited
UNITED STATES PATENTS

| | | | |
|---|---|---|---|
| 1,769,837 | 7/1930 | Hull .............................. | 317/233 |
| 2,213,209 | 9/1940 | Lange et al. .................. | 317/230 |
| 3,248,613 | 4/1966 | Griffin et al. ................. | 317/230 |
| 3,331,002 | 7/1967 | Everitt .......................... | 317/230 |
| 3,466,508 | 9/1969 | Boae ............................. | 317/230 |

*Primary Examiner*—James D. Kallam
*Attorney*—Dressler, Goldsmith, Clement & Gordon ABSTRACT: A method is described for forming a hermetic seal on a wet electrolytic device having a metal container and a metal closure member, and containing a liquid electrolyte. The method comprises placing the closure member in sealing position with respect to the container to form a seam between them, and electric resistance welding the container and the closure member together at a series of positions along the seam. During the welding operation at each welding position, the closure member and the container are pressed together at the portion of the seam being welded and that portion is bathed in a fluid, preferably the electrolyte used in the device, to provide uniform electrical conditions to the weld area. Typically, the container and closure member are made of tantalum. Also disclosed is a hermetically sealed electrolytic device of the type described above which is reduced in internal pressure at room temperature to permit the liquid electrolyte to expand upon heating of the device with less pressure buildup.

PATENTED MAR 2 1971
3,568,009
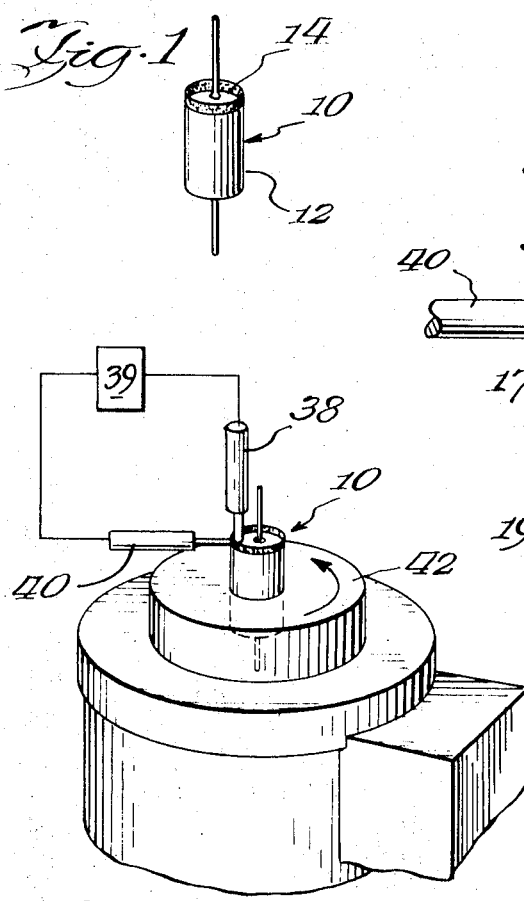
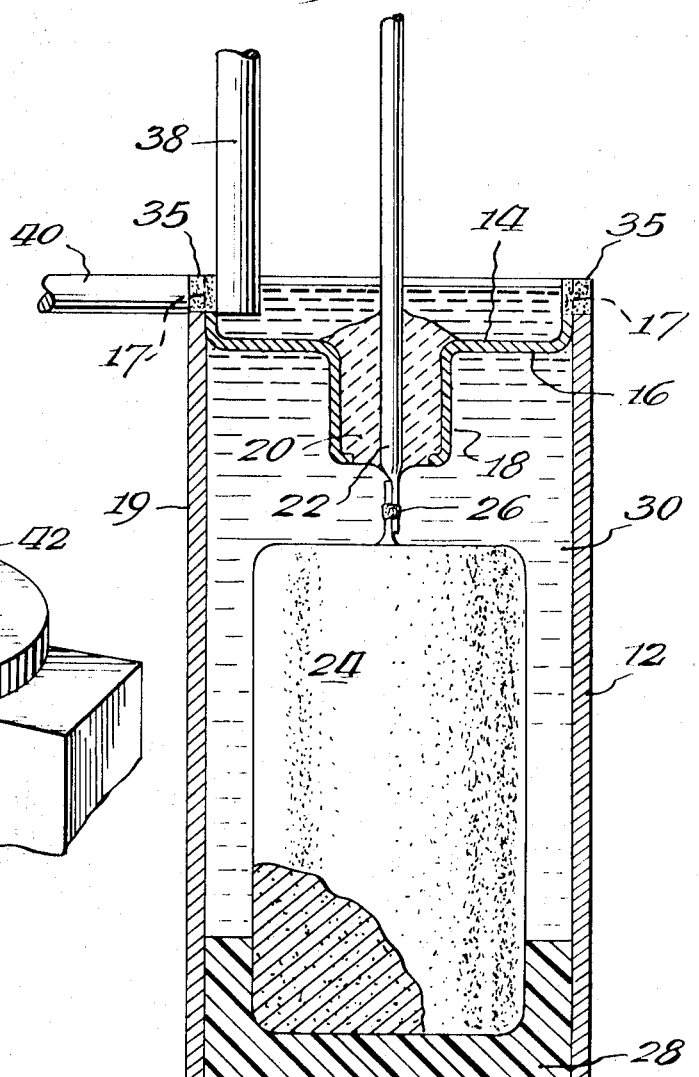
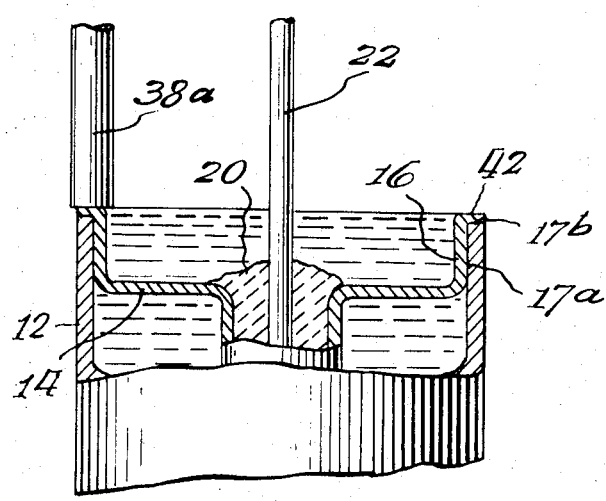
INVENTOR
Bernard Rappaport
BY Dressler, Goldsmith, Clement & Gordon
ATTORNEYS

HERMETICALLY SEALED ELECTROLYTIC DEVICE

BACKGROUND OF THE INVENTION

Electrolytic devices which contain liquid electrolyte are commonly called "wet electrolytic device." Such devices include capacitors having a porous tantalum anode sealed along with a liquid electrolyte such as sulfuric acid in a metal container, which is also desirably made of tantalum.

It is desirable to prepare an hermetic seal for the above devices which is resistant to high temperatures, to prevent the leakage of liquid electrolyte from the devices during use due to seal breakage through shock or thermal degradation.

It is also desirable to prepare hermetic seals for electrolytic devices by welding the metallic closure member to the metal container, to provide a strong bond between them. However, in wet electrolytic devices, the presence of the liquid electrolyte near the weld area has, in the past, interferred with the quality of the weld and has resulted in a weakened, porous seal. Thus, manufacturers have been unable to prepare hermetic seals in wet electrolytic devices by welding, and have been forced to resort to other types of closures which have not been as satisfactory as a welded closure ideally could be.

SUMMARY OF THE INVENTIOn

This application relates to a method for forming an hermetic seal for an electrolytic device having a metal container and a metal closure member to seal said container, said device containing liquid electrolyte, which method comprises: positioning said closure member in sealing position with respect to said container to form a seam therebetween, and electrically welding said container and said closure member together at a series of positions along said seam, pressing said closure member and container together at each welding position while welding at said position, and bathing each said position of welding in a fluid to provide essentially uniform electrical conditions while welding at said position.

It has been found that the above technique results in a uniformly welded seam between the closure member and the container. The difficulties ordinarily engendered by the presence of liquid electrolyte at the welding positions are overcome by pressing the closure member and container together at the welding position and bathing the welding position in a fluid during the welding process.

Without wishing to be limited to any one theoretical explanation of why the invention of this application provides superior results, it is believed that electrolyte seeping through the weld seam to the exterior of the container and closure member tends to form intermittent alternate circuit paths through the escaping electrolyte across the seam, in addition to the current through the weld area. This intermittent alternate circuit path shunts a portion of the electrical energy which was intended to form the electric weld, resulting in a poor weld.

This situation cannot be corrected simply by increasing the electrical energy to be passed through the weld because of the intermittent nature of the electrolyte circuit path. The amount of electrolyte escaping at each position can vary considerably, thereby altering the electrical conditions under which the weld is being attempted. If little or no electrolyte is present when the electric energy provided is intended to account for the alternate circuit path, too much energy is passed through the weld, which also results in a poor weld. Thus the intermittent presence of electrolyte which has seeped from the weld seam gives welds of erratic quality.

According to the present invention, it is contemplated to correct this difficulty by bathing in a fluid each portion of the weld seam at the surface of the electrolytic device while welding the portion in order to stabilize the electrical conditions at the weld area, so that an essentially uniform amount of electrical current passes through each portion of the closure member and container adjacent the weld seam to form uniform welds.

Preferably, the fluid used to bathe the weld seam is the electrolyte used in the electrolytic device. What is required is that the area at the surface of the weld seam is thoroughly wet with the electrolyte to provide a uniform, alternate electric circuit across the surface of the weld seam. More energy can be passed between the welding electrodes to account for the uniform, alternate circuit, and uniform welds in each case are thus produced. The electrolyte used can be that which seeps out of the weld seam during the welding process, supplemented as needed by externally added electrolyte.

Fluids other than the electrolyte might also be used, such as conductive fluids to maintain a uniform electric current bridge across the weld seam, or nonconductive fluids to sweep away electrolyte leaking from out of the weld seam, thus disrupting the alternate electric current bridges across the weld seam as they form.

When either or both of the closure member and container are made of tantalum or any other metal which is reactive to air at high temperatures, the fluid which is used to bathe the exposed portions of the weld seam can serve the additional function of protecting the closure member and container from the air during the welding process. Thus, improved welds of tantalum components and the like can be obtained without excluding air from the immediate vicinity of the welding.

Any form of electric welding, in which the parts being welded are pressed together, can be used. Electric resistance welding, in which the electric current is passed directly through the metal portions adjacent the weld seam, is commonly used, a spot-welding process being preferred.

The closure member and container are pressed together at the welding position, typically with a pressure of at least about 1,000 p.s.i., during the welding to force the liquid electrolyte within the seam formed between the closure member and outer container away from the weld area to keep it from interfering with the formation of a proper weld.

It is preferred for the closure member and container used to be capable of producing nonporous welds. Thus, in the case of parts made of tantalum and tantalum alloys, it is preferred to use cast metal parts such as those made by electron beam melting.

DESCRIPTION OF THE DRAWINGS

FIG. 1 is a perspective view of an hermetically sealed device prepared by the process of this invention.

FIG. 2 is a diagrammatic perspective view of the apparatus used for welding a metallic closure member to a container in the process of preparing an hermetic seal on a wet electrolytic device.

FIG. 3 is an enlarged sectional view of a wet electrolytic device having a metallic closure member and container which are in the process of being welded together to form an hermetic seal.

FIG. 3a is a detail of an alternate embodiment of the device shown in FIG. 3.

DESCRIPTION OF SPECIFIC EMBODIMENT

Referring to the drawings, an electrolytic device 10, for example having dimensions of about three-eighths by five-eighths inch, is shown with a container 12 and a closure member 14, both of which are typically made of electron beam melted tantalum or a tantalum alloy. The specific device shown is an electrolytic capacitor, but it is contemplated to apply this invention to other types and designs of electrolytic devices. Closure member 14 is shown as an annular disc which has an upstanding flange 16 about its outer periphery, and is sized to fit closely into the open end of container 12 with the flange 16 abutting the inside of the mouth of container 12, to define a seam 17 therebetween. Flange 16 is shown to face the exterior of container 12 with respect to the closure member 14 for ease of welding. The closure member 14 also has an inner collar 18 about the annular opening of closure member 14.

In this embodiment, the inside of container 12 has a thin layer 19 of a gold film overlaid with a platinum black film to provide a conductive surface having increased surface area to container 12, which improves the performance of the device 10 as a capacitor. Layer 19 may extend along weld seam 17, in which case, a portion of layer 19 becomes incorporated in the completed weld.

The space defined by collar 18 is filled with a bead of glass 20, hermetically sealing the annular opening of closure member 14. Connector wire 22 passes through bead 20 in similar hermetically sealing relationship.

Anode 24 is generally made in a conventional manner from porous tantalum, and is shown welded by spotweld 26 to the inner end of wire 22. Anode 24 is protected from flexing and vibration by spacer 28, made of an inert material such as polytetrafluoroethylene. The remaining space within closure member 14 and container 12 is filled with a liquid electrolyte 30, commonly sulfuric acid of a concentration of about 39 percent. To complete the major parts of the wet electrolytic capacitor shown by way of example herein, a second connector wire 32 is shown welded to the container 12.

The capacitor shown herein is typically assembled by first preparing a subassembly comprising the closure member 14, wire 22, glass bead 20 and electrode 24, prior to inserting the above parts within container 12. After the above subassembly is prepared, spacer 28 is placed within container 12, and the container is filled with the liquid electrolyte. The above subassembly is then inserted into the container 12, care being taken to flush as many air bubbles as possible out of the interior of the device as closure member 14 is moved inwardly, forcing electrolyte to flow out of the device through the seam 17 defined between flange 16 and the mouth portion of container 12. Thus, essentially all air bubbles are removed from the interior of the outer container 12, while the exposed area 35 in the vicinity of seam 17 is bathed in electrolyte which has escaped from seam 17. More electrolyte is added to exposed area 35 as needed to keep the area wet.

After the closure member has been positioned as described above within container 12, a pair of welding electrodes 38 and 40 are brought to bear against the mouth of outer container 12 and flange 16, to press the latter two members together while passing electric current from welder 39 between electrodes 38 and 40, forming a spotweld along seam 17 between flange 16 and the mouth of container 12. Each spotweld overlaps the previous spotweld by an amount sufficient to insure a good hermetic seal, typically from 30 to 50 percent of the previous spotweld.

For parts made of tantalum or alloys having roughly similar strength characteristics, a typical pressure of at least 1,000 p.s.i., exerted between electrodes 38 and 40, is used to exclude electrolyte from seam 17 at the area of welding.

In the specific embodiment shown, the electrodes have a diameter of one-eighth inch. Thus, a desirable pressure between the electrodes corresponds to a total force of about 250 ounces.

As an alternative embodiment, FIG. 3a shows the upper end of upstanding flange 16 of closure member 14 with a horizontal collar 42 which overlies the upper end of container 12. In that configuration, weld seam 17 has both a vertical portion 17a and a horizontal portion 17b, the horizontal portion 17b leading to the exterior of the container. Pressure can then be applied against the weld seam by an electrode 38a urging the collar 42 about flange 16 downwardly against the upper lip of container 12. In this embodiment, only one pressing electrode is required rather than two because the single electrode exerts a downward force against the container which is held immovable in a recess or holder (not shown) which also serves as the second electrode to provide a current path for welding.

As shown in FIG. 2, the electrolytic capacitor 10 rests in a recess in rotating table 42 which has a heater within it (not shown) to provide device 10 with a desired temperature during the welding process. It is desirable for this temperature to be elevated, typically from about 60° to 110° C. but below the boiling point of the liquid electrolyte used. The reason for this is that after the hermetic seal has been formed by welding, and the device 10 is cooled, contraction of the electrolyte within the sealed device results in the formation of a reduced pressure, and often a vacuum bubble or ullage, within the device at room temperature. Thus, upon heating of the electrolytic device once again during use, it exhibits resistance to bursting at high temperatures since there is room for expansion of the electrolyte within the device upon heating, normal pressure not being reached within the device until it is heated to the temperature at which the hermetic seal was formed. In the exemplary process shown herein, the temperature of device 10 is maintained at 100° C.

As welds are formed in the vicinity of seam 17 by electrodes 38 and 40, rotating table 42 turns device 10 to another position to present another portion of seam 17 to electrodes 38 and 40 for welding. Equipment for welding electrolytic devices in accordance with the process of this invention is commercially available, e.g. a Unitek spotwelder model No. 1-065-02 with a model 2-101-01 welding head.

In the embodiment shown, the overlapping spotwelds are prepared with a pulse of direct electric current, the outer electrode 40 being generally the anode and inner electrode 38 the cathode. When welding electrodes which are one-eighth inch in diameter are used, a suitable energy setting for each electrical pulse is 16 watt-seconds, and the duration of each pulse is typically 0.0035 seconds.

When container 12 and closure member 14 are made of tantalum, welding electrodes made of tungsten (e.g. Mallory 0100W) are desirably used for minimum adhesion of the electrodes to the electrolytic device.

From the foregoing, it will be observed that numerous variations and modifications may be effected without departing from the true spirit and scope of the novel concept of the invention. It is, of course, intended to cover by the appended claims all such modifications as fall within the scope of the claims.

I claim:

1. A sealed electrolytic device comprising a container and a closure member hermetically sealing said container, said device including at least one electrode and an electrolyte within said container, and an atmosphere within said container having a pressure, at room temperature, below the atmospheric pressure external of said container, whereby said container is restrained against rupture when subject to adverse pressure conditions.

2. The sealed device of claim 1 in which said container and closure member are made of metal.

3. The sealed device of claim 2 in which said container and closure member are made of tantalum.

4. The sealed device of claim 1 in which said electrolyte is a liquid solution.